Aug. 25, 1931.  B. RZECZKOWSKI  1,820,161
PLANT FOR TREATING GAS
Filed Jan. 10, 1929   3 Sheets-Sheet 2
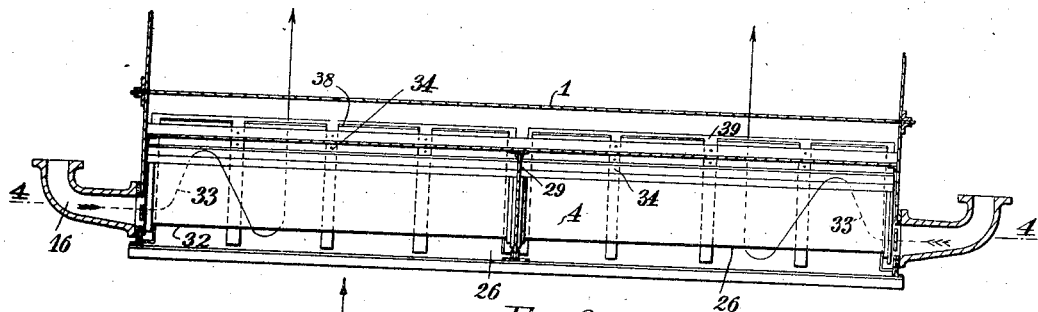
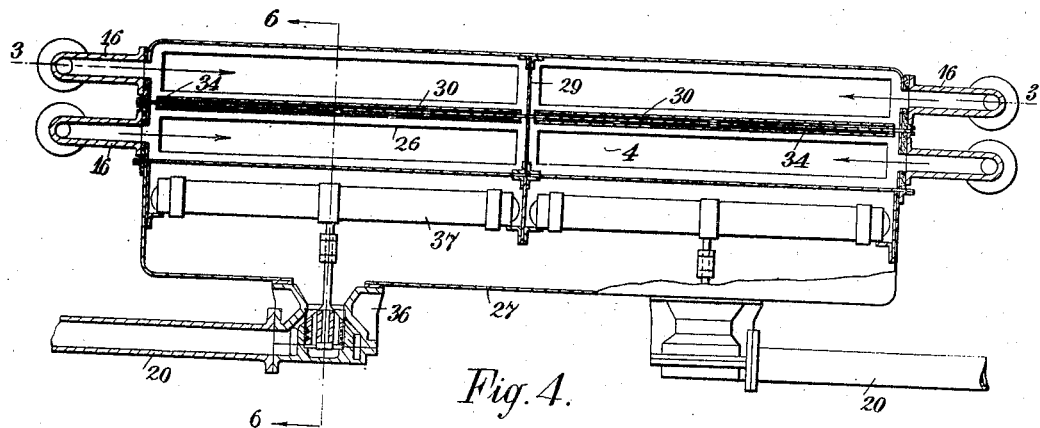
B. Rzeckowski
INVENTOR
By: Marks &Clerk
Attys.

Patented Aug. 25, 1931

1,820,161

UNITED STATES PATENT OFFICE

BRONISŁAW RZECZKOWSKI, OF SOSNOWICE, POLAND

PLANT FOR TREATING GAS

Application filed January 10, 1929, Serial No. 331,442, and in Poland January 23, 1928.

This invention relates to a plant for cleaning, cooling and saturating gases by means of liquids, or for cooling the latter, and consists more particularly in atomization of liquids in special atomizers acting by means of compressed gas.

Another object of this invention is to provide a plant for cleaning and cooling gases, for example such gases as are derived from blast furnaces, which plant is composed of a vertical container of rectangular horizontal section having an inlet and outlet for the gas and a file of special arrangements till now unknown in the use by similar plants, as atomizers operating by means of compressed gas and injecting atomized liquid into the container, and fixed on the outward sides of the container in different elevations of the latter, and positioned in equal distances from one another between the inlet and outlet openings for the gas; whereby in each plane of the horizontal section of the container they act by only one atomizer, fixed to one of the four sides of the container, and injecting the atomized liquid as a continual current into the container through only one in this elevation horizontal slot extending along the entire width of the said side-wall of the container; atomizers are fixed outwardly only on the two opposite side walls of the container, thus one atomizer is fixed to the one side and the next lower or higher positioned atomizer is fixed on the opposite side of the container; each atomizer is as long as the entire width of the side wall of the container. A similar plant may be used for cooling liquid by means of gas, as for example water by means of air, as also, for saturating gas with liquid as for example air with water, by only insignificant change of the fundamental construction of the plant depending only on the nature of the process.

Figure 1:
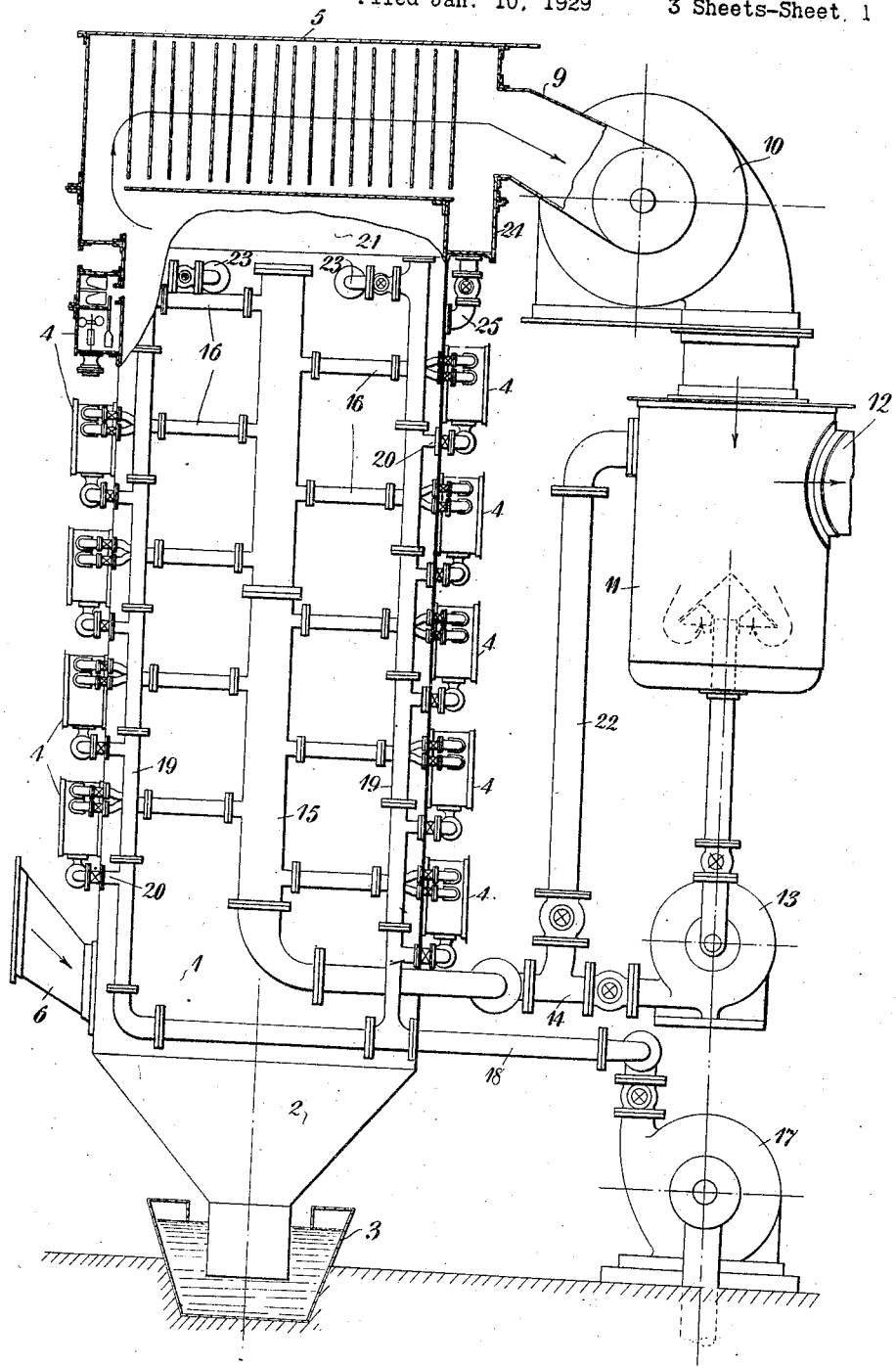
Figure 2:
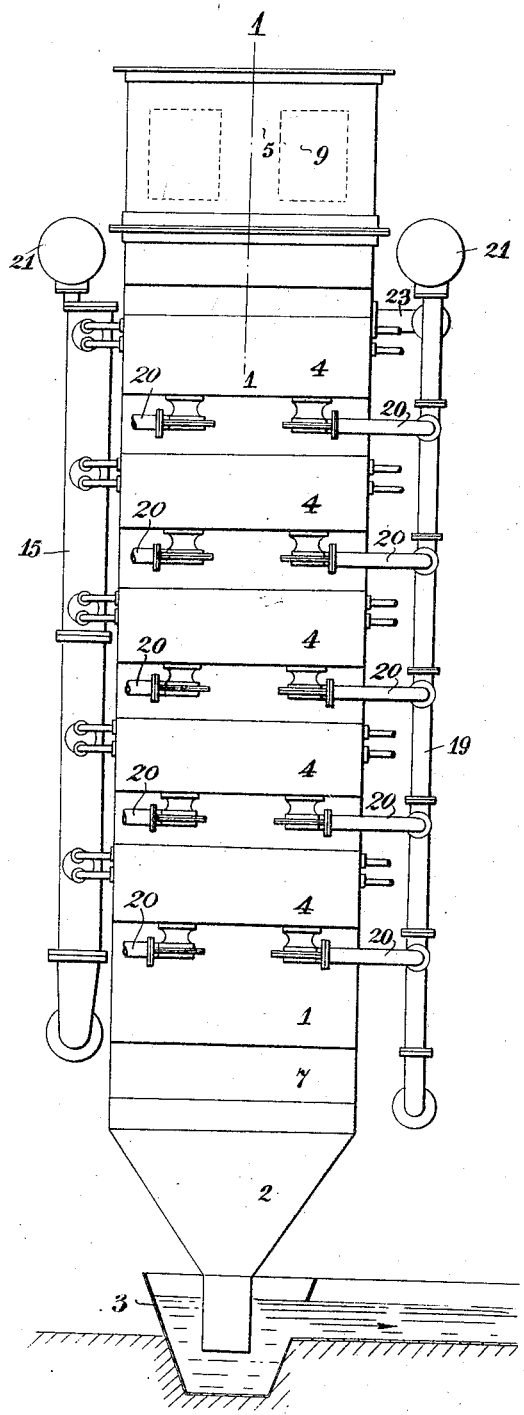
Figure 7:
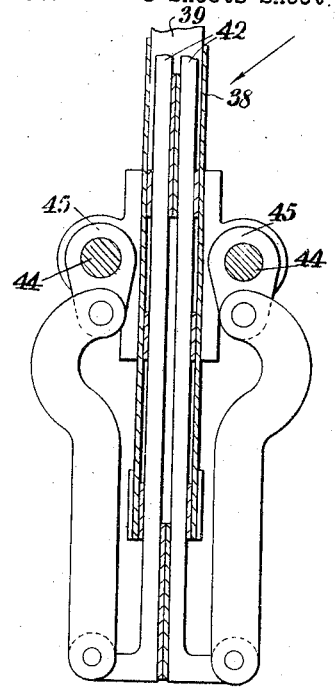
Figure 6:
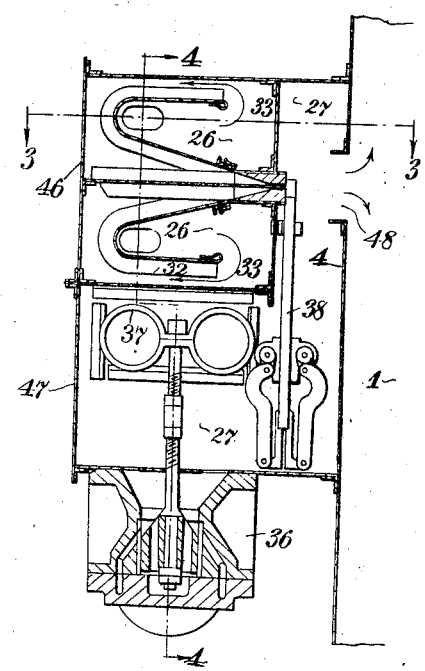

A plant according to the invention is shown in the accompanying drawings, Fig. 1 being a side elevation of the plant partly in vertical section on the line 1—1 of Fig. 2; Fig. 2 a front elevation; Fig. 3 an element of the container of the plant, in horizontal section viewed from above on the line 3—3 of Fig. 4 and Fig. 4 the same element in vertical section on the line 4—4 of Fig. 3 viewed in the direction of the arrow; Fig. 5 a vertical section on an enlarged scale through the outflow part of the atomizer; Fig. 6 a vertical section through the atomizer on the line 6—6 of Fig. 3; Fig. 7 a vertical section of a portion of the atomizer on an enlarged scale, also on the line 6—6 of Fig. 4.

The construction of the plant and its operation are as follows:

Referring to the drawings, 1 is a vertical rectangular container in which the gas is cleaned from dust and comprises an upper part having water separating means 5 therein, a middle part of uniform horizontal section and a lower part 2 which tapers to form a funnel having its lower end extending into a sump 3. Mounted on two opposite side walls of the middle part of the container 1 are a plurality of atomizers 4, which are superposed with the atomizers on the one side wall staggered with respect to those on the other wall. The length of the atomizers 4 is equal to the width of the sides of the container to which they are fixed. The uncleaned gas enters the container from below in the direction of the arrow 6 through a rectangular opening 7 and rises impinging against and mixing with the watery mist particles projected by the lowermost atomizer and with the cleaned gas used for atomizing the water therein. Under the action of its kinetic energy, the gas passes to the opposite wall of the container, where it meets the watery mist and cleaned gas projected by the next atomizer, and is conveyed thereby back again to the opposite wall, and so on.

The gas which rises in the container mixes energetically with the water mist, whereby all the dust particles, which become more and more moistened, increase in weight until they are finally incapable of rising and fall together with the water into the sump 3, while the clean, but highly moistened gas escapes through a rectangular opening in the side of the container, at the top of the middle part thereof in the direction of the arrow 8 and after travelling through the water separator 5 its passes in the dried state through two openings and the pipes 9 to the blower 10 into the drum 11 which compresses it and delivers it to the pipe 12 which conveys the clean and dry gas to the desired place. A second, smaller blower 13 withdraws from the drum 11 a portion of the clean gas and after further compressing the gas, delivers it through the pipe 14 to the atomizers through vertical pipes 15 and horizontal pipes 16 which terminate in two branches. The air passes into each atomizer through four inlets, two on either side of the atomizer. The water to be atomized is supplied by the centrifugal pump 17 and passes through the pipe 18 and thence through two systems of pipes on both sides of the container 1, namely the vertical pipes 19 and the horizontal pipes 20, the water passing to each atomizer through two inlets at the bottom thereof. For deaerating the water in the water pipes and for avoiding shocks two air vessels 21 are provided at the top of the two systems of pipes one on either side of the upper part of the container. Under certain working conditions of the plant, where the difference in pressure of the uncleaned gas in the container 1 and of the cleaned gas in the drum 11 is considerable, the blower 13 may be cut out and the compressed gas passed directly through the pipe 22 from the drum 11 to the atomizers through the pipes 15 and 16, the valves in the pipes 14 and 22 being suitably adjusted. For starting up the plant after it has been standing, the drum not yet containing any clean gas, only the blower 10 and the pump 17 are put in operation, the valves in the pipes 14 and 22 being so adjusted that the gas cannot reach the atomizers, water is passed through the pipes 23 into the interior of the upper part of the container 1, where it is passed through a system of suitably perforated horizontal tubes, after which it falls as a dense, fine rain downwardly through the whole cross-section of the container. Uncleaned gas is then passed into the container and is cleaned by the action of the shower thus produced. After it has been ascertained that the gas has been sufficiently cleaned, the gas is passed to the blower 13 and may then be admitted to the atomizers, the operation proceeding step by step until the whole plant is functioning normally. The water from the water-separating device 5 accumulates during the normal working of the plant in the container 24 and flows through the pipes 25 over a syphon within the upper part of the container into the system of perforated tubes referred to, whence it descends in the form of rain into the lower part of the container, where it again does useful work. The sump 3 forms a liquid seal with an overflow for receiving the dirty water from the container.

The dimensions of the container and the number of atomizers will vary in accordance with the amount of impurities contained in the gas and the quantity of gas to be cleaned in a given time. Generally the cross-section of the container can always be made the same, only its height being varied and the number of atomizers being varied. The basic feature of locating the atomizers on opposite sides of the container, however, must be adhered to.

The body of each atomizer is divided into four gas chambers, two upper ones and two lower ones, and a water and gas chamber 27 which is filled at the bottom with water and at the top with gas. The compressed gas for operating the atomizers passes to each of the four gas chambers through the pipes 16 and oval openings in the lateral walls of the atomizer, either two upper chambers, or the two lower ones alone or all four chambers being in operation at one time and for this purpose the walls 28 separating the upper chambers from the lower ones are hermetically sealed. The walls 29 separating the upper chambers from one another and the lower chambers from one another need not be hermetically sealed. Each chamber has horizontal slots which communicate with the interior of the container 1, those of the upper chambers being wider than those of the lower chambers. The sheet metal members 30 are connected at 31 to the V-shaped sheet metal members 32 forming channels, each channel being somewhat shorter than the chamber, so that, when required, these channels can be inserted into the chambers or be removed therefrom. The members 32 which are suitably fixed both to the side walls of the chambers and to the members 30 force the gas which enters the chambers through the pipes 16 to follow the path indicated by the arrows 33, distributing itself uniformly in the chambers by entering through the slots in the same, and consequently to pass through the entire length of the slots at the same velocity and the same pressure. The slots in the gas chambers are formed by the vertical surfaces of the insertions 34 between the sheet metal member 28 and the sheet metal members 30 and horizontal surfaces of the insertions 35 which are fixed to the sheet metal member 30 in the spaces between the insertions 34. By changing the thickness of the insertions 35 and keeping the thickness of the insertions 34 constant, the width of the slots can be varied as required, which slots, however, cannot be changed during the operation of the plant owing to the circumstance that the two sheet metal members 30, the sheet metal member 28, the two insertions 34 between the said sheet metal members and the angles 30 above the sheet metal members, are all clamped to parts of the insertions 34 by means of bolts and thus form a re-inforced system. The water passes into the water chamber 27 through openings in the wall of the atomizer under the control of two automatic valves 36 each provided with two tubular floats 37 which maintain a constant water level in the chamber, from the pipes 20, 19 and 18 on both sides of the container 1 to the pump 17. Two suction devices 38 are fixed to the side walls of the gas chambers below the slots therein each suction device consisting of two metal sheets of rectangular form, one resting on the other with insertions 39 between them. In the lower and middle part of the suction devices between each two adjacent insertions is a passage, the upper part of which is divided by means of a sheet metal partition 40 and insertions 41 into two narrow slots of the width of the gas chamber slots, the width of these slots being capable of regulation similarly to those in the gas chamber, by altering the thickness of the insertions 41. The latter may be omitted and be fixed in the orifices of the suction devices. The length of the suction slots is the same as that of the gas chamber slots, the insertions 39 of the suction devices fitting into the gas chamber insertions 34.

In the lower part of each suction channel two bars 42 are provided, on the upper ends of which are fixed pieces of sheet metal 43. These bars are connected together at their lower bent ends by means of levers with arms 44, the upper ends of which are bent and rest on rollers 45 which are provided at both sides of the suction device and extend beyond the side walls of the atomizer. When the rollers 45 are turned through 180° the bars 42 with the sheet metal pieces 43 are raised or lowered independently of one another. In this way the slot openings of the suction devices are closed or opened and at the same time are cleaned from deposits from the water. There are four rollers 45, two each on either side of the atomizer, consequently the slots can be closed and opened as desired in such a manner that at the top only a narrow slot or a broader slot is operative, or in such a manner that both slots operate to produce the effect of a slot of the width of the two slots together. The slots of the gas chambers and of the suction devices are combined in such a manner that the narrower slots in the gas chambers are in the lower ones and the narrower slots in the suction devices are those nearer the outlets of the slots in the gas chambers, while the wider slots in the suction devices are further from the outlets of the gas chambers. For inserting or removing the V-shaped sheet metal members 32 from the gas chambers, and the floats 37, the suction device 38 or any other parts from the water chambers, when the plant is inoperative, the front doors of the atomizers are made of two parts 46 and 47 which are closed by screws. When the compressed gas is forced into the gas chambers it will pass through the slots in the chambers, producing a partial vacuum in the region of the outlets of the suction devices. This causes the water to be withdrawn by suction from the water and gas chamber and to be atomized. The mixture of atomized water and gas passes through a rectangular opening 48 extending over the entire width of the container 1 into the interior of the latter, where it produces an energetic cleaning action on the particles of the uncleaned gas rising in the container, moistening of the dust particles contained in the container and the removal of the dust particles together with mist and drops of water.

As the possibility is provided as explained above of working in three different ways with the gas chambers and the suction devices, nine different degrees of atomization of the water may be carried out with the same pressure of compressed air of which the lowest degree of atomization is produced when the lower gas chambers with narrow slots and two suction slots are working, while the strongest degree of atomization takes place when all the gas chambers and only one narrow suction slot are working. By altering the working of the separate atomizers by varying the quantity of inflow and the pressure of the gases in such a manner that for instance the lower atomizers atomize strongly while the upper ones atomize weakly or vice versa, or by using only some of the atomizers the remainder remaining inoperative, and finally by causing some of the atomizers to work with gas without water endless combinations in the working of the plant and the most varied effects may be obtained at different levels of the container. This provides an almost unlimited possibility of regulating the working of the plant to adapt it to the amount of impurity in the gas, its increasing or decreasing quantity, the temperature of the uncleaned gas and the water used for cleaning and so on.

The above described plant may also be used for cooling air and various gases by means of water, more particularly since the impure air and especially the impure gas, which must have the dust particles removed from them, in practice usually have a high temperature which is lowered by the process of cooling the air or the gas with cold water. When it is only a question of moistening the air or the gas but not cooling it, the water-separating device is removed from the plant described, which device would otherwise have an opposite effect, removing the water particles from the moistened air or the gas in the container. The plant may also be altered, not as regards its fundamental construction, but as regards the dimensions of the container, the number of atomizers and so on, where the air or the gas is to be cooled or moistened in smaller quantities, and even the form of the whole plant may be altered to adapt it to different working conditions, the dimensions being changed to such an extent that it is no longer a plant but only an apparatus, the essential characteristics of the construction, however, remaining the same as in the large plant. When used for this purpose the atomizer retains the same fundamental construction as in the plant for cleaning the air or the gas, only the dimensions and the external appearance being changed, where small quantities of cooled and moistened air or gas are to be dealt with.

For cooling the water and other liquids, a vertical tower is used which is rectangular in horizontal cross-section. The tower is usually made of wood when used for cooling water or of sheet iron or some other metal when other liquids are to be cooled. The tower is open at the bottom for the entry of the air and has atomizers on either side as in the gas cleaning plant. The atomizers work with air which is supplied to them directly from the outside by a blower. The atomizers atomize the water or some other liquid which is to be cooled and throw it in the form of small particles into the interior of the tower through openings in the walls of the tower extending over the full width of the same. The upper part of the tower usually has an opening at the end, through which the air entering at the bottom and, in its passage through the tower and the atomized water or other liquid in the same, withdraws heat from the same and escapes to the outside under natural draught, the cooled water falling into the container of the tower and flowing away. In some cases the upper part of the tower may be closed in which case the air is drawn by suction into the tower by means of a fan. The atomizers do not take the cooled liquid from the closed chamber, which is the case in the plant for cooling the gas, but directly from the open container into which the water or other liquid to be cooled flows. In the plant intended to be used for this purpose, the atomizer is of the same construction as in the plant for cleaning and cooling gas, with the above-mentioned difference that it has no closed chamber for cooling the water, but only an open container.

What I claim is:

1. A plant for the treatment of gas, including a vertical container rectangular in cross section, means for injecting currents of atomized liquid into the container at different elevations and perpendicularly to the path of the gas passing through the container, each of the injecting means extending entirely across one side of the rectangular container.

2. A plant for the treatment of gas, including a vertical container rectangular in cross section, means for injecting currents of atomized liquid into the container at different elevations and perpendicularly to the path of the gas passing through the container, each of the injecting means extending entirely across one side of the rectangular container, and the successive injecting means throughout the height of the container being arranged on opposite sides of the latter.

3. A plant for the treatment of gas including a vertical container rectangular in cross section and having inlet and outlet openings for gas therein, a plurality of atomizing devices arranged externally of the container and located at different levels between the inlet and outlet openings, said atomizing devices being adapted to inject atomized liquid into the container, and means for supplying liquid and compressed gas to said atomizing devices.

4. A plant for the treatment of gas including a vertical container rectangular in cross section and having inlet and outlet openings for gas therein, a plurality of atomizing devices arranged externally of the container and located at different levels between the inlet and outlet openings, said atomizing devices being adapted to inject atomized liquid into the container, and means for supplying liquid and compressed gas to said atomizing devices, said atomizing devices being alternately arranged on opposite sides of the container.

5. A plant for the treatment of gas including a vertical container rectangular in cross section and having inlet and outlet openings for gas therein, a plurality of atomizing devices arranged externally of the container and located at different levels between the inlet and outlet openings, said atomizing devices being adapted to inject atomized liquid into the container, and means for supplying liquid and compressed gas to said atomizing devices, said atomizing devices being arranged in sets on opposite sides of the rectangular container and the atomizing devices of one set being displaced vertically with respect to the atomizing devices of the other set.

6. A plant for the treatment of gas including a vertical container rectangular in cross section and having inlet and outlet openings for gas therein, a plurality of atomizing devices arranged externally of the container and located at different levels between the inlet and outlet openings, said atomizing devices being adapted to inject atomized liquid into the container, and means for supplying liquid and compressed gas to said atomizing devices, each of said atomizing devices being divided into paths of chambers, each chamber having separate inlet and outlet openings whereby the fluid passage through the respective chambers may be controlled.

7. A plant for treating gas including a vertical container rectangular in cross section having inlet and discharge openings, atomizing devices arranged to inject atomized liquid into the container, each atomizing device including pairs of chambers and each chamber having a separate inlet and outlet, the outlets of the upper chambers being in horizontal line and extending throughout one side of the container and the outlets of the lower chambers being arranged in a second horizontal plane below the outlets of the upper chambers.

8. A plant for treating gas including a vertical container rectangular in cross section having inlet and discharge openings, atomizing devices arranged to inject atomized liquid into the container, each atomizing device including pairs of chambers and each chamber having a separate inlet and outlet, the outlets of the upper chambers being in horizontal line and extending throughout one side of the container and the outlets of the lower chambers being arranged in a second horizontal plane below the outlets of the upper chambers, the outlet openings of the lower chambers being narrower than the outlet openings of the upper chambers.

9. A plant for treating gas including a vertical container rectangular in cross section and having a gas inlet and a gas outlet, atomizing devices arranged to inject atomized liquid into the container, each atomizing device including a liquid chamber provided with an outlet slot for liquid and compressed gas chambers arranged above the liquid chamber and having gas outlets, the outlets of the gas and liquid chambers being arranged in parallel relation.

10. A plant for treating gas including a vertical container rectangular in cross section and having a gas inlet and a gas outlet, atomizing devices arranged to inject atomized liquid into the container, each atomizing device including a liquid chamber provided with an outlet slot for liquid and compressed gas chambers arranged above the liquid chamber and having gas outlets, the outlets of the gas and liquid chambers being arranged in parallel relation, said outlet openings being of different area and extending throughout the entire width of one side of the container.

11. A plant for treating gas including a vertical container rectangular in cross section having inlet and discharge openings, a plurality of atomizing devices arranged to inject atomized liquid into the container, each atomizing device including gas and liquid chambers provided with gas and liquid outlets, respectively, and independent means for controlling the passage of gas and liquid through said outlets.

12. A plant for treating gas including a vertical container rectangular in cross section and having gas inlet and discharge openings, a plurality of atomizing devices arranged to inject atomized liquid into the container and disposed at various elevations throughout the height of the container, said atomizing devices being arranged in groups on opposite sides of the container and the atomizing devices in one group being disposed in staggered relation to those of the other group, and the atomizing devices of both groups having communication with the container through openings extending throughout the entire width of the corresponding sides of the container, each atomizing device including pairs of chambers, the upper chambers being adapted to contain compressed gas and the lower chambers a liquid, said chambers having outlets communicating with the openings in the side walls of the container, and means for controlling the passage of gas and liquid through the openings in the gas and liquid chambers.

In testimony whereof I have signed my name to this specification.

BRONISŁAW RZECZKOWSKI.